United States Patent
Kamiya

[19]

[11] Patent Number: 5,974,232
[45] Date of Patent: Oct. 26, 1999

[54] IMAGE PROCESSING APPARATUS THAT EXECUTES ABORTION OF IMAGE PROCESSING AND METHOD OF RESUMING ABORTED IMAGE PROCESSING

[75] Inventor: Satoshi Kamiya, Ebina, Japan

[73] Assignee: Fuji Xerox Co., Ltd., Tokyo, Japan

[21] Appl. No.: 08/798,906

[22] Filed: Feb. 12, 1997

[30] Foreign Application Priority Data

Feb. 16, 1996 [JP] Japan ................................. 8-029571

[51] Int. Cl.⁶ ......................................................... H04N 1/21
[52] U.S. Cl. .......................... 395/112; 395/113; 395/115; 358/437; 358/444; 358/468
[58] Field of Search ..................... 395/112–116; 358/437, 358/468, 444, 404, 296, 401

[56] References Cited

U.S. PATENT DOCUMENTS

| 5,206,735 | 4/1993 | Gauronski et al. | 358/296 |
| 5,245,368 | 9/1993 | Farrell et al. | 358/401 |
| 5,422,985 | 6/1995 | Tanaka | 395/113 |

FOREIGN PATENT DOCUMENTS

A-5-77525  3/1993  Japan.
A-6-149494  5/1994  Japan.

*Primary Examiner*—Scott Rogers
*Attorney, Agent, or Firm*—Oliff & Berridge, PLC

[57] ABSTRACT

An image processing apparatus includes: an input means for inputting image data to be subjected to an image process; a storage means for storing the image data inputted from the input means; a processing means for reading out the image data stored in the storage means and subjecting the read image data to an instructed image process; an abortion means for aborting the image process of the image data performed by the processing means; a hold instructing means for giving an instruction as to whether or not the image data whose process has been aborted by the abortion means is to be continuously held in the storage means; a hold means for continuously holding the image data in the storage means based on the instruction from the hold instructing means; an execution means for reading out the image data in the storage means held by the hold means from the storage means and resuming the image process of the image data aborted by the abortion means; and a delete means for deleting the image data held in the storage means by the hold means.

23 Claims, 14 Drawing Sheets

FIG. 4
| JOB ID | OWNER ID | HOST ID | PRIORITY | RECEIPT TIME | PROCESSING SEQUENCE | CONDITION |
|---|---|---|---|---|---|---|
| j1 | 0001 | 0001 | p1 | t1 | 1 | active |
| j2 | 0002 | 0002 | p3 | t2 | 2 | active |
| j3 | 0002 | 0003 | p5 | t3 | 4 | active |
| j4 | 0003 | 0001 | p1 | t4 | 3 | active |
| ... | ... | ... | ... | ... | ... | ... |
48
FIG. 5A
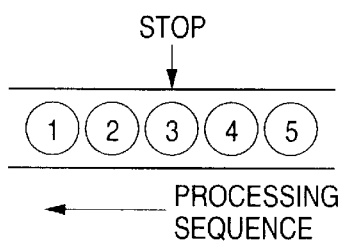
JOB TABLE 48
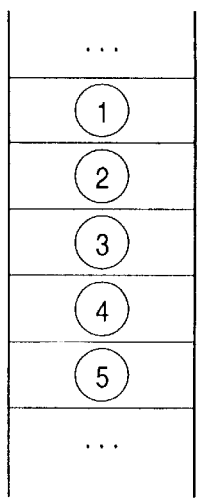
IMAGE STORAGE MEANS 51
FIG. 5B
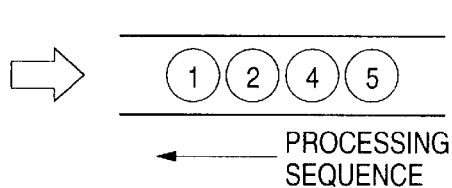
JOB TABLE 48
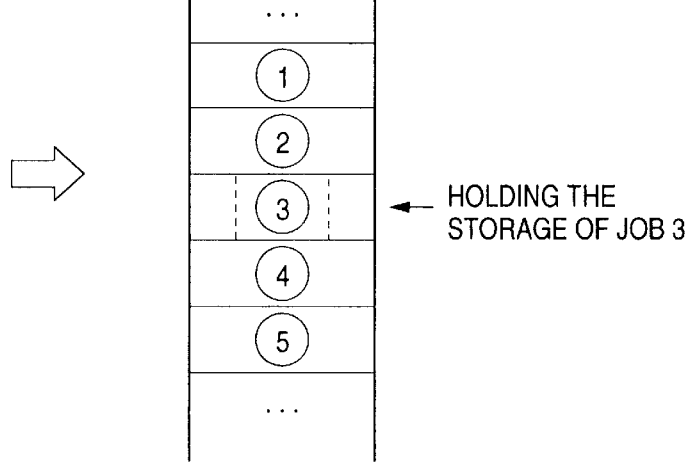
IMAGE STORAGE MEANS 51

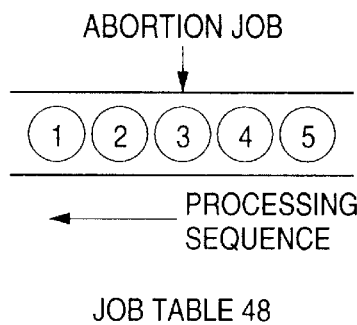
*FIG. 6A*
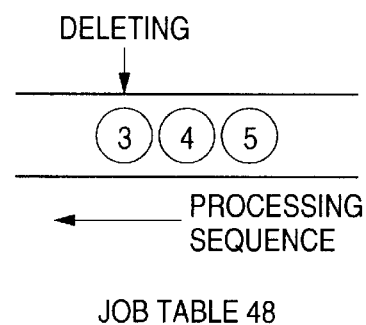
*FIG. 6B*
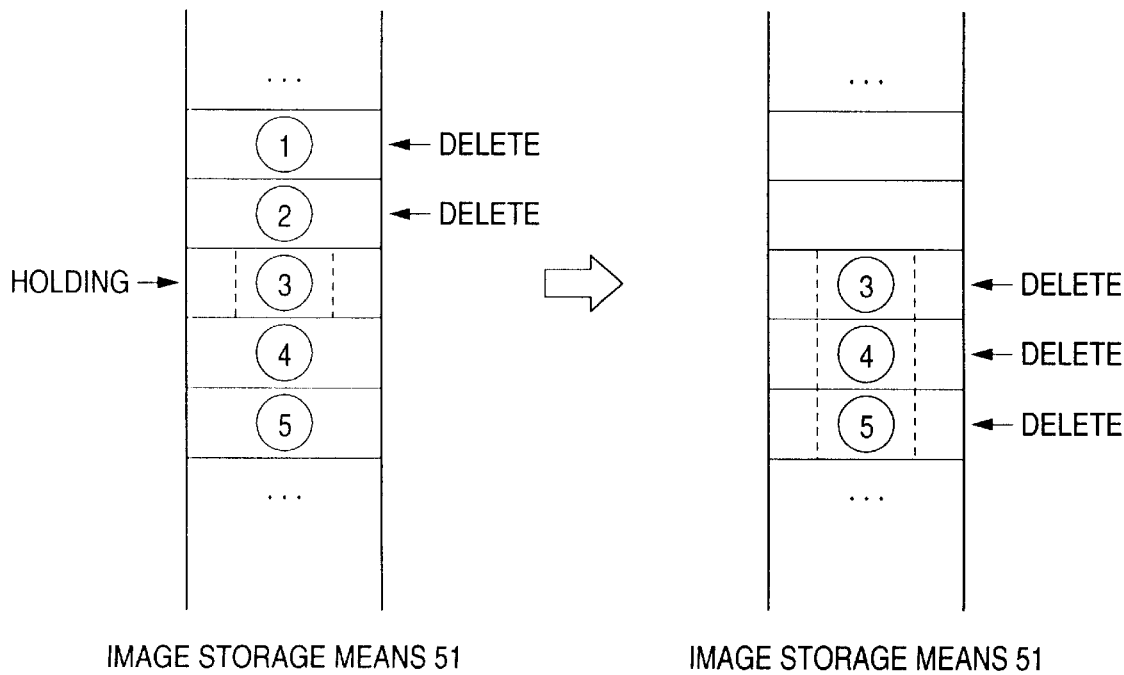

JOB TABLE 48

JOB TABLE 48

IMAGE STORAGE MEANS 51

IMAGE STORAGE MEANS 51

JOB TABLE 48

JOB TABLE 48

IMAGE STORAGE MEANS 51

IMAGE STORAGE MEANS 51

JOB TABLE 48

JOB TABLE 48

IMAGE STORAGE MEANS 51

IMAGE STORAGE MEANS 51

JOB TABLE 48

IMAGE STORAGE MEANS 51

JOB TABLE 48

IMAGE STORAGE MEANS 51

JOB TABLE 48

JOB TABLE 48

IMAGE STORAGE MEANS 51

IMAGE STORAGE MEANS 51

JOB TABLE 48

IMAGE STORAGE MEANS 51

JOB TABLE 48

IMAGE STORAGE MEANS 51

IMAGE PROCESSING APPARATUS THAT EXECUTES ABORTION OF IMAGE PROCESSING AND METHOD OF RESUMING ABORTED IMAGE PROCESSING

BACKGROUND OF THE INVENTION

1. Field of the Invention

The invention relates to an image processing apparatus that can not only abort an image process efficiently but also resume the once aborted image process with a reduced number of process steps.

2. Description of the Related Art

When a printer is executing a print command (job) for a large-sized image, such a job disturbs the outputting of other jobs. In order to allow the other jobs to be printed prior to a previously inputted job, the previously inputted job must be canceled. To do so, a printer disclosed in Unexamined Japanese Patent Publication No. Hei. 5-77525 aborts printing at the time a print abortion instruction has been given. This printer also aborts sheet feed operation in addition to the print abortion, and clears print data and reads but discards all data sent from a host.

Further, disclosed in Unexamined Japanese Patent Publication No. Hei. 6-149494 is an invention that selectively deletes either a job stored in a receiving buffer or an image based on such job from a memory when a print abortion instruction has been given.

According to Unexamined Japanese Patent Publications Nos. Hei. 5-77525 and Hei. 6-149494, to process a once aborted image, the image must be read in again, which has causes a waste of time for image processing. Further, time for discarding read data is also required. Still further, an image must be read in after an operator confirm that printer is vacant.

In a conventional image processing apparatus, the processing of a job whose priority is higher has often been retarded by the abortion processing of a job whose priority is lower. Further, in such a case, since once read data is discarded, such once read data cannot be used again.

SUMMARY OF THE INVENTION

An object of the invention is therefore to provide an image processing apparatus that can overcome these problems.

To achieve the above object, according to a first aspect of the invention, there is provided an image processing apparatus comprising: an input means for inputting image data to be subjected to an image process; a storage means for storing the image data inputted from the input means; a processing means for reading out the image data stored in the storage means and subjecting the read image data to an instructed image process; an abortion means for aborting the image process of the image data performed by the processing means; a hold means for continuously holding the image data whose process has been aborted by the abortion means in the storage means; and an execution means for reading out the image data in the storage means held by the hold means from the storage means and resuming the image process of the image data aborted by the abortion means.

According to a second aspect of the invention, there is provided an image processing apparatus according to the first aspect further comprising: a continuous input means for continuously inputting from the input means the image data whose process has been aborted by the abortion means.

According to a third aspect of the invention, in an image processing apparatus according to the second aspect, a continuous input instructing means for giving an instruction as to whether or not the image data is to be continuously inputted by the input means is arranged, and the continuous input means continues inputting the image data on the condition that the continuous input instructing means has given an instruction for continuously inputting the image data.

According to a fourth aspect of the invention, in an image processing apparatus according to the first aspect, the processing means performs a process for printing the image data.

According to a fifth aspect of the invention, there is provided an image processing apparatus comprising: an input means for inputting image data to be subjected to an image process; a storage means for storing the image data inputted from the input means; a processing means for reading out the image data stored in the storage means and subjecting the read image data to an instructed image process; an abortion means for aborting the image process of the image data performed by the processing means; a hold instructing means for giving an instruction as to whether or not the image data whose process has been aborted by the abortion means is to be continuously held in the storage means; a hold means for continuously holding the image data in the storage means based on the instruction from the hold instructing means; an execution means for reading out the image data in the storage means held by the hold means from the storage means and resuming the image process of the image data aborted by the abortion means; and a delete means for deleting the image data held in the storage means by the hold means.

According to a sixth aspect of the invention, in an image processing apparatus according to the fifth aspect, a continuous input instructing means for giving an instruction as to whether or not the image data is to be continuously inputted by the input means is arranged, and the continuous input means continues inputting the image data on the condition that the continuous input instructing means has given an instruction for continuously inputting the image data.

According to a seventh aspect of the invention, there is provided an image processing apparatus according to the fifth aspect further comprising: a priority determining means for determining a priority of the image data to be subjected to an image process by the processing means; and a priority descending means for descending the priority determined by the priority determining means with respect to the image data whose process performed by the processing means has been ended.

According to an eighth aspect of the invention, in an image processing apparatus according to the seventh aspect, the delete means deletes the image data held by the hold means from the storage means if there is no instruction from the execution means by an image processing time to be determined by the priority determined by the priority determining means.

According to a ninth aspect of the invention, in an image processing apparatus according to the fifth aspect, the delete means deletes the image data held by the hold means from the storage means if a process of all image data inputted by the input means has been ended.

According to a tenth aspect of the invention, in an image processing apparatus according to the fifth aspect, the delete means deletes the image data held by the hold means from the storage means if a volume of image data stored by the storage means exceeds a predetermined value.

According to an eleventh aspect of the invention, an image processing apparatus according to the fifth aspect further comprises: a function recognizing means for recognizing a function of a job possessed by the image data inputted from the input means; and in such image processing apparatus, the delete means determines a sequence of deletion of the image data based on the function of the job recognized by the function recognizing means.

According to a twelfth aspect of the invention, there is provided an image processing apparatus according to the fifth aspect further comprising: a continuous input means for continuously inputting the image data whose process has been aborted by the abortion means from the input means.

According to a thirteenth aspect of the invention, in an image processing apparatus according to the twelfth aspect, a continuous input instructing means for giving an instruction as to whether or not the image data is to be continuously inputted by the input means is arranged, and the continuous input means continues inputting the image data on the condition that the continuous input instructing means has given an instruction for continuously inputting the image data.

According to a fourteenth aspect of the invention, in an image processing apparatus according to the fifth aspect, the processing means performs a process for printing the image data.

According to a fifteenth aspect of the invention, there is provided a method of resuming an aborted image process comprising the steps of: inputting image data to be subjected to an image process; storing the inputted image data in a memory; and reading out the image data stored in the memory from the memory and subjecting the read image data to an instructed image process; and aborting the image process of the image data; continuously holding the image data whose process has been aborted in the memory; and resuming the image process of the image data whose process has been aborted by reading out the image data continuously held in the memory.

According to a sixteenth aspect of the invention, there is provided a method of resuming an aborted image process according to the fifth aspect further comprising the step of continuously inputting the image data whose process has been aborted.

According to a seventh aspect of the invention, in a method of resuming an aborted image process according to the fifteenth aspect, the image process is a process for printing the image data.

According to an eighteenth aspect of the invention, there is provided a method of resuming an aborted image process comprising the steps of: inputting image data to be subjected to an image process; storing the inputted image data in a memory; and reading out the image data stored in the memory from the memory and subjecting the read image data to an instructed image process; aborting the image process of the image data; continuously holding the image data whose process has been aborted in the memory; and resuming the image process of the image data whose process has been aborted by reading out the image data continuously held in the memory; and deleting the image data held in the memory based on an instruction.

According to a nineteenth aspect of the invention, a method of resuming an aborted image process according to the eighteenth aspect further comprises the step of continuously inputting the image data whose process has been aborted.

According to a twentieth aspect of the invention, in a method of resuming an aborted image process according to the eighteenth aspect, the image process is a process for printing the image data.

According to a 21st aspect of the invention, i characterized in that a method of resuming an aborted image process according to the eighteenth aspect further comprises the steps of: determining a priority of the image data to be subjected to the image process by the processing means; and descending the priority determined by the priority determining means with respect to the image data whose image process has been ended.

According to a 22nd aspect of the invention, a method of resuming an aborted image process according to the 21st aspect further comprises the step of deleting the image data held in the memory if no instruction for resuming the image process has been given by an image processing time to be determined by the priority determined.

According to a 23rd aspect of the invention, a method of resuming an aborted image process according to the 21st aspect further comprises the step of deleting the image data held in the memory if all image processes of data to be processed among the image data have been ended.

According to a 24th aspect of the invention, a method of resuming an aborted image process according to the eighteenth aspect further comprises the step of deleting the image data held in the memory if the volume of image data stored in the memory exceeds a predetermined value.

According a 25-th aspect of the invention, a method of resuming an aborted image process according to the eighteenth aspect further comprises the step of recognizing a function of a job possessed by the image data inputted; and determining a sequence of deletion of the image data based on the function of the job recognized.

According to a 26-th aspect of the invention, a method of resuming an aborted image process according to the eighteenth aspect further includes the step of continuously inputting the image data whose image process has been aborted.

According to a 27-th aspect of the invention, in a method of resuming an aborted image process according to the eighteenth aspect, the image process is a process for printing the image data.

BRIEF DESCRIPTION OF THE DRAWINGS

The above and other objects and features of the present invention will be more apparent from the following description taken in conjunction with the accompanying drawings.

FIG. 4 is a diagram illustrative of a format of a job table 48 of FIG. 3;

FIGS. 5A and 5B are diagrams illustrative of a method of aborting a job whose data has been received in embodiment 1;

FIGS. 6A and 6B are diagrams illustrative of an operation in the case where an image storage hold instruction has been given to a hold instructing means 52 in embodiment 1;

DETAILED DESCRIPTION OF THE PREFERRED EMBODIMENTS

Embodiments of the invention will now be described with reference to the drawings.

Embodiment 1

Figure 1:
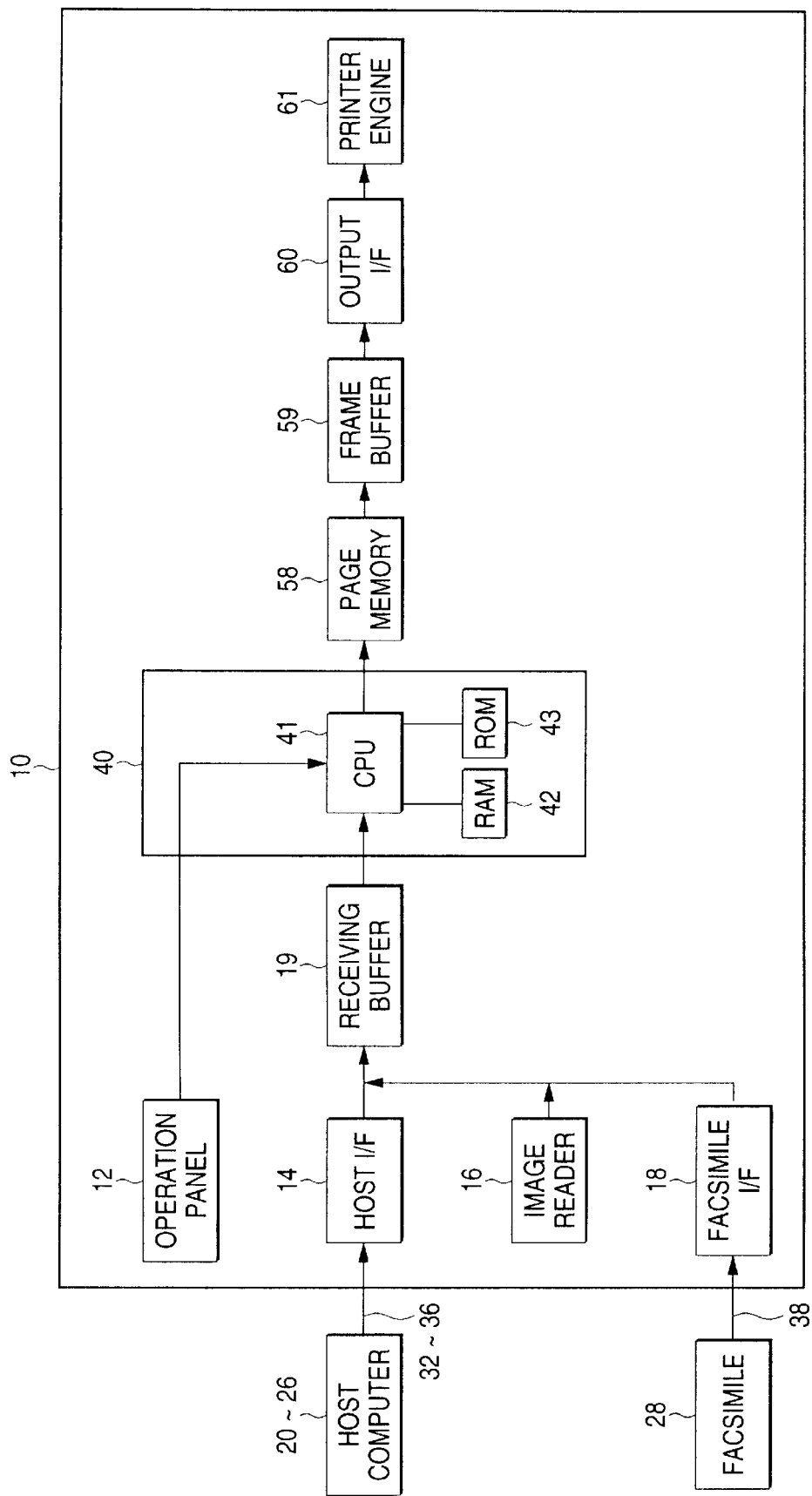
FIG. 1 is a block diagram showing a configuration of an image processing apparatus according embodiment 1 of the invention.

FIG. 1 is a block diagram showing a configuration of an image processing apparatus in the present embodiment. An image processing apparatus 10 has an operation panel 12, a host interface 14, an image reader 16, a facsimile interface 18, a receiving buffer 19, a CPU unit 40, a page memory 58, a frame buffer 59, an output interface 60, and a printer engine 61.

Execution or abortion of an image process is operated through the operation panel 12. The host interface 14 receives images from host computers 20 to 26 that are connected thereto either directly or through a network and stores the received images in the receiving buffer 19. The image reader 16 reads an image on a recording medium such as recording paper and OHP and sends the read image to the receiving buffer 19. The facsimile interface 18 receives an image from a facsimile 28 connected thereto through a public communication line and stores the received image in the receiving buffer 19.

The CPU unit 40 has a CPU 41, a RAM 42, and a ROM 43. The CPU unit 40 processes an image stored in the receiving buffer 19 and stores the processed image in the page memory 58. The image stored in the page memory 58 is sent to the frame buffer 59 and outputted to the printer engine 61 through the output interface 60. The printer engine 61 outputs the received image to a recording medium such as recording paper.

Figure 2:
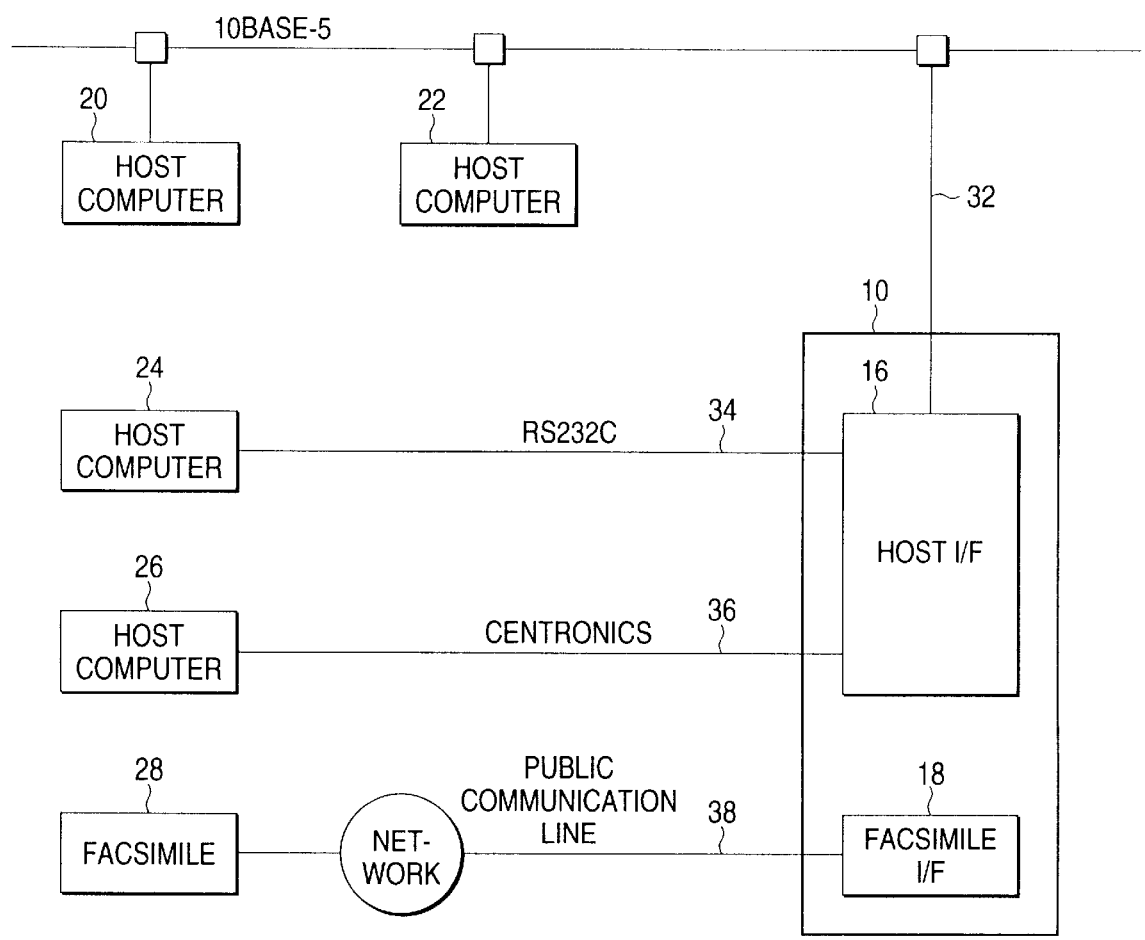
FIG. 2 is a diagram illustrative of a system configuration in embodiment 1.

FIG. 2 is a diagram illustrative of a connection among the host interface 14, the facsimile interface 18, and external devices. The host interface 14 has a means for connecting thereto a plurality of host computers 20, 22 through the Ethernet, a means for connecting thereto a host computer 24 through the RS-232C 34, and a means for connecting thereto a host computer 26 through the Centronics 36. The facsimile interface 18 has a means for connecting thereto a facsimile 28 through a public communication line 38.

Figure 3:
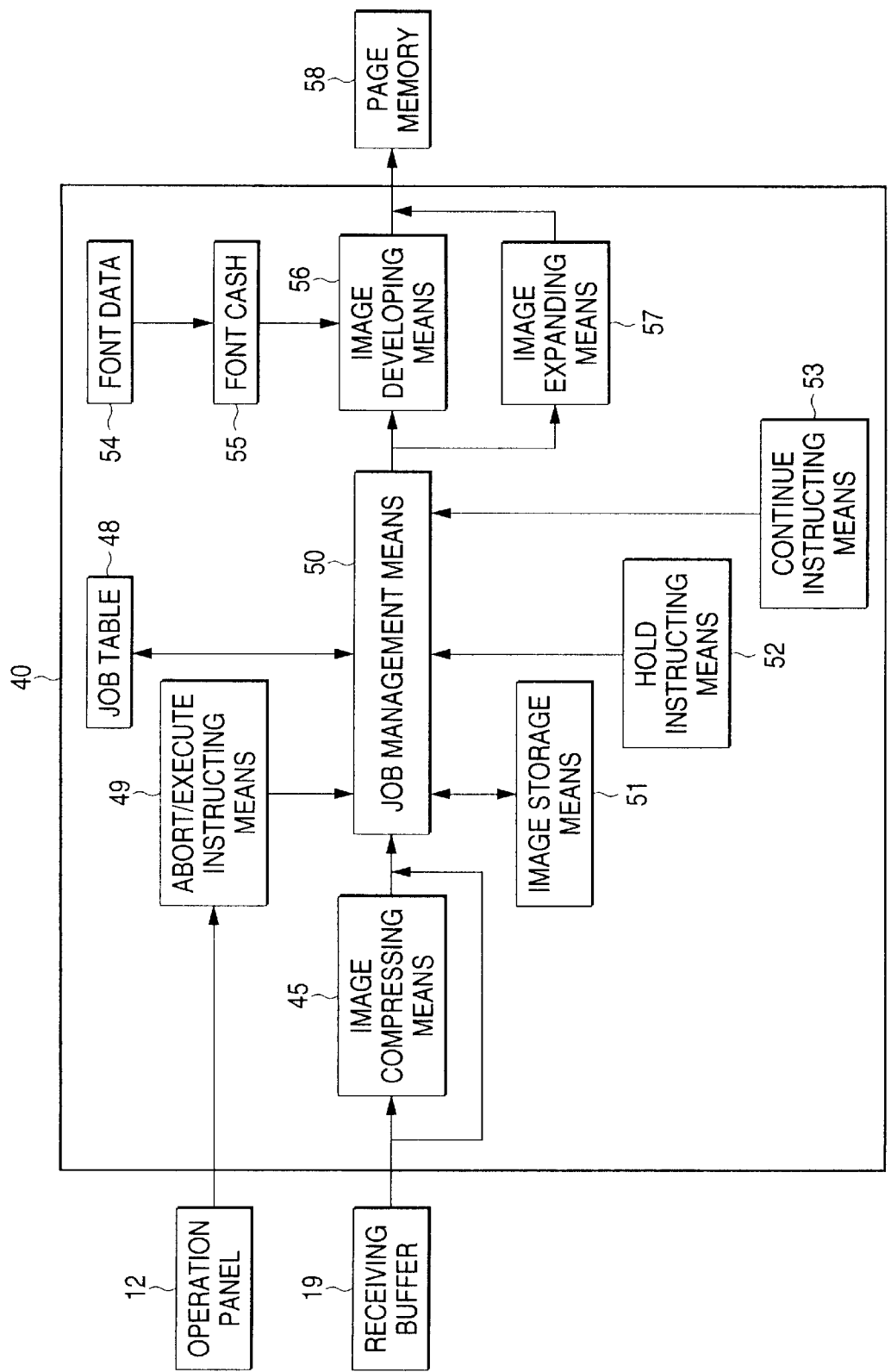
FIG. 3 is a functional block diagram showing a functional configuration of a CPU unit 40 of FIG. 1.

FIG. 3 is a functional block diagram showing a functional configuration of the CPU unit 40 in FIG. 1. The CPU unit 40 has as functions thereof an image compressing means 45, a job table 48, an abortion/execution instructing means 49, a job management means 50, an image storage means 51, a hold instructing means 52, a continue instructing means 53, font data 54, a font cache 55, an image developing means 56, and an image expanding means 57.

The image compressing means 45 compresses an image sent from the receiving buffer 19. The job management means 50 stores the received image from the receiving buffer 19 in the image storage means 51 if there is a vacancy in the image storage means 51. When the image is stored in the image storage means 51, the job table 48 stores the job ID, owner ID, host ID, priority, and receipt time of a job stored in the image storage means 51. Further, the job table 48 sets "active" a condition flag of the job of the image stored in the image storage means 51, and further stores the processing sequence of the image. The image developing means 56 prepares image data by interpreting code data of the image and stores the prepared image in a page memory 58. The image expanding means 57 expands the compressed image.

Job Ids are assigned to all stored jobs, respectively. Owner ID is assigned to a user who has inputted a job. Priority is a flag indicating that there is a prioritized output request instruction from a user. Receipt time is a flag indicating a time at which a job is stored in the image storage means 51. Condition flag is a flag indicating that a job can be printed (active) or cannot be printed (inactive). The abort/execution instructing means 49 instructs the job management means 50 to abort or execute the concerned job based either on an abortion/execute key (not shown) operation or on an abortion/execute command from a host computer.

The job management 50 manages a job based on the job table 48. Further, the job management means 50 changes the condition flag of the job table 48 based on an abort/execute instruction sent from the abort/execute instructing means 49. By changing the condition flag to "inactive"., the job execution is aborted. Further, by changing the condition flag to "active", a process of the data that has been held but not yet outputted is executed. The hold instructing means 52 gives the job management means 50 an instruction as to whether or not the aborted job and the processed job are to be held. The continue instructing means 53 gives the job management means 50 an instruction as to whether or not data receiving operation is to be continued when there is an abort instruction during data receiving operation.

The font data 54 stores outline font data. The font cache 55 stores bit map data generated out of the outline font data stored in the font data 54. The bit map data of each font is read out from the font cache 55, and images for a single page are stored in the page memory 58. The image expanding means 57 expands compressed images and stores the expanded images in the page memory 58.

FIG. 4 shows a format of the job table 48 of FIG. 3. The job table 48 stores the owner ID, host ID, priority, receipt time, processing sequence, and condition so as to correspond to a job ID. The processing sequence is determined, e.g, by priority and receipt time. In the example shown in FIG. 4, a job whose job ID is j3 (simply referred to as "job j3") is given a higher priority over job j4. Further, since the difference between receipt times (t4–t3) is small, the processing sequence is changed so that job j4 will precede job j3.

FIGS. 5A and 5B are diagrams illustrative of a method of aborting a job whose data receipt has been completed. In FIGS. 5A and 5B, encircled numbers respectively indicate the IDs of jobs stored in the image storage means 51. It is assumed that jobs 1 to 5 are given priorities in the order of 1, 2, 3, 4, 5. When an instruction for aborting job 3 has been given from the abort/execute instructing means 49, the job management means 50 reads out from the hold instructing means 52 information as to whether or not the holding of the storage of job 3 has been instructed. If the job 3 storage hold instruction has not been given, the abort/execute instructing means 49 deletes the image of job 3 from the image storage means 51 as in the conventional example.

FIGS. 6A and 6B are diagrams illustrative of an operation when an image storage hold instruction has been given to the hold instructing means 52. When an image storage hold instruction has been given, the job management means 50 holds the image of job 3 as it is without deleting the image from the image storage means 51 (FIG. 6A). Further, the condition flag of job 3 is changed from "active" to "inactive", so that job 3 will no longer be processed. The job management means 50 thereafter processes jobs from job 1 onwards sequentially. Upon having processed job 1 and job 2 whose priorities are higher than job 3, the job management means 50 deletes job 3 and thereafter processes job 4 and job 5 (FIG. 6B).

Figure 7A:
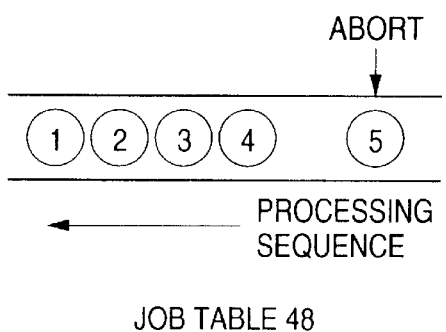
FIGS. 7A and 7B are diagrams illustrative of a method of aborting a job whose data is being received in embodiment 1.
Figure 7B:
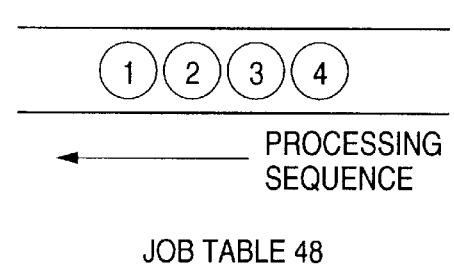
Figure 7B:
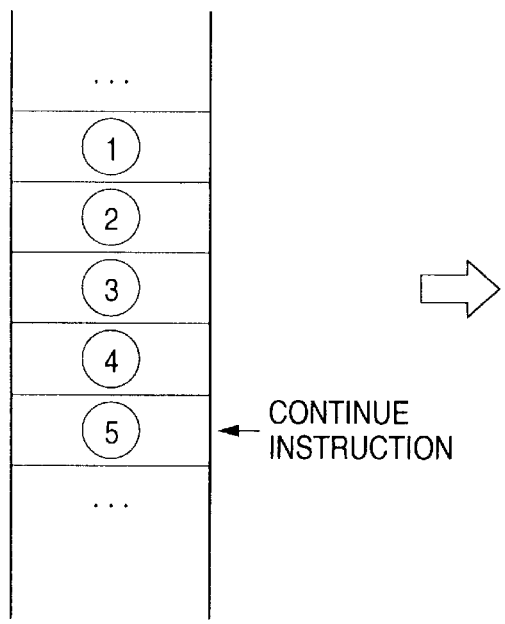
Figure 7B:
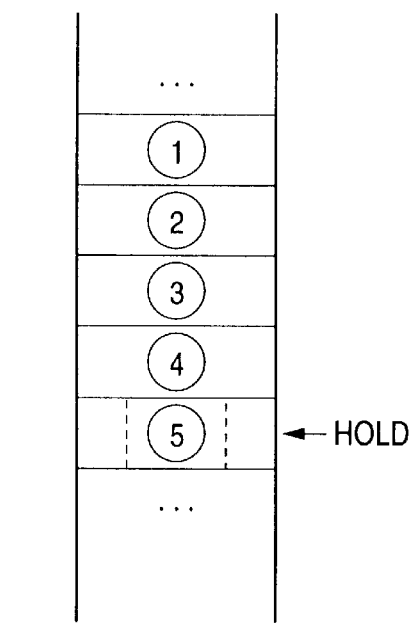

FIGS. 7A and 7B are diagrams illustrative of a method of aborting a job whose data is being received. When a job abort instruction is given from the abort/execute instructing means 49 while job 5 is being received, the job management means 50 reads out from the continue instructing means 53 information as to whether or not an input continue instruction has been given. If the input continue instruction has been given, the receiving of job 5 is continued without aborting receiving the data of job 5 (FIG. 7A). The received job 5 is stored in the image storage means 51 and the condition flag of job 5 is stored in the job table 48 after having been set "inactive" (FIG. 7B). In a manner similar to the case where the job whose data has been received is aborted, job 5 is deleted after jobs 1, 2, 3, 4 whose priorities are higher have been processed.

Figure 8A:
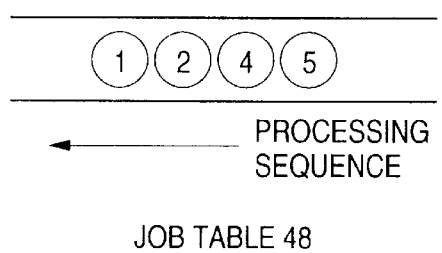
FIGS. 8A and 8B are diagrams illustrative of executing a job in embodiment 1.
Figure 8B:
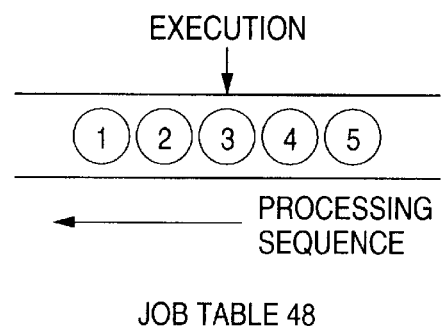
Figure 8B:
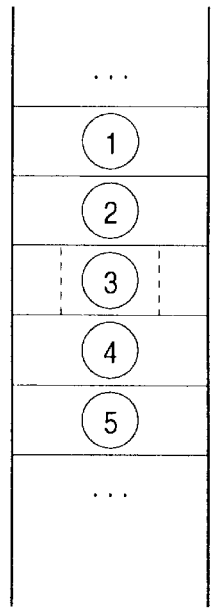
Figure 8B:
Figure 8B:
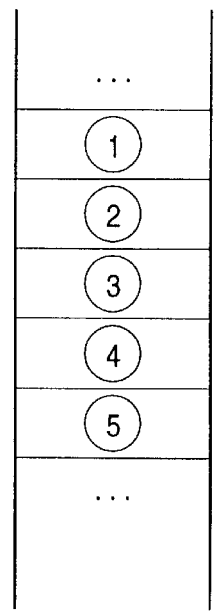

FIGS. 8A and 8B are diagrams illustrative of a method of executing a job whose condition flag is set "inactive". In FIG. 8A, the condition flag of job 3 is set "inactive". When informed that a job whose condition flag is set "inactive" is to be executed from the abort/execute instructing means 49, the job management means 50 changes the condition flag of that job in the job table 48 to "active". Then, such job is rescheduled as a job to be processed (FIG. 8B). Since the conditions at the time the job has been received including the receipt time are held, the job is processed in the same sequence as in the case where there has been no abort instruction.

Figure 9A:
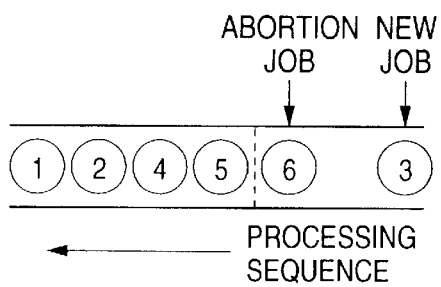
FIGS. 9A and 9B are diagrams illustrative of a method of deleting a job in embodiment 1.
Figure 9B:
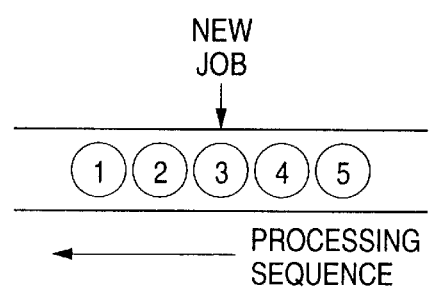
Figure 9B:
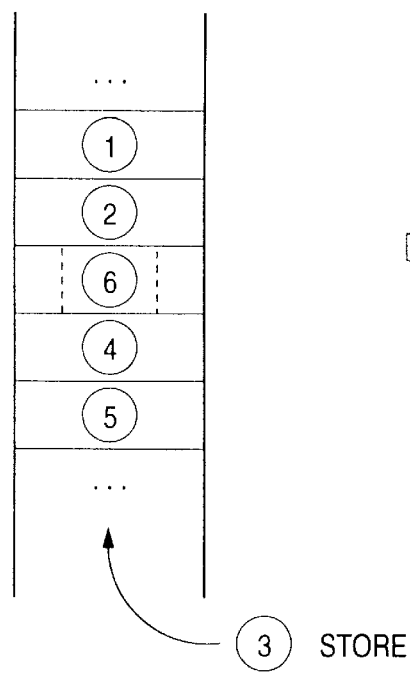

FIGS. 9A and 9B are diagrams illustrative of a job delete timing. When the image storage means 51 has area thereof filled up with many jobs stored therein, the jobs are deleted. In FIGS. 9A and 9B, job 6 is the oldest job whose condition flag has been changed to "inactive" with the processing thereof aborted by an abort instruction from the abort/execute instructing means 49. When new data has been received, inactive jobs are deleted sequentially from the old to the new. In FIGS. 9A and 9B, job 6 is deleted. When an adequate area is reserved for storing new data, a new job is scheduled based on priority and receipt time. In FIGS. 9A and 9B, the new job is scheduled to be processed as a third job. Then, the processing is resumed. If there is no inactive job, the processing of a new job is waited for until memory becomes vacant similarly to the conventional example.

Figure 10:
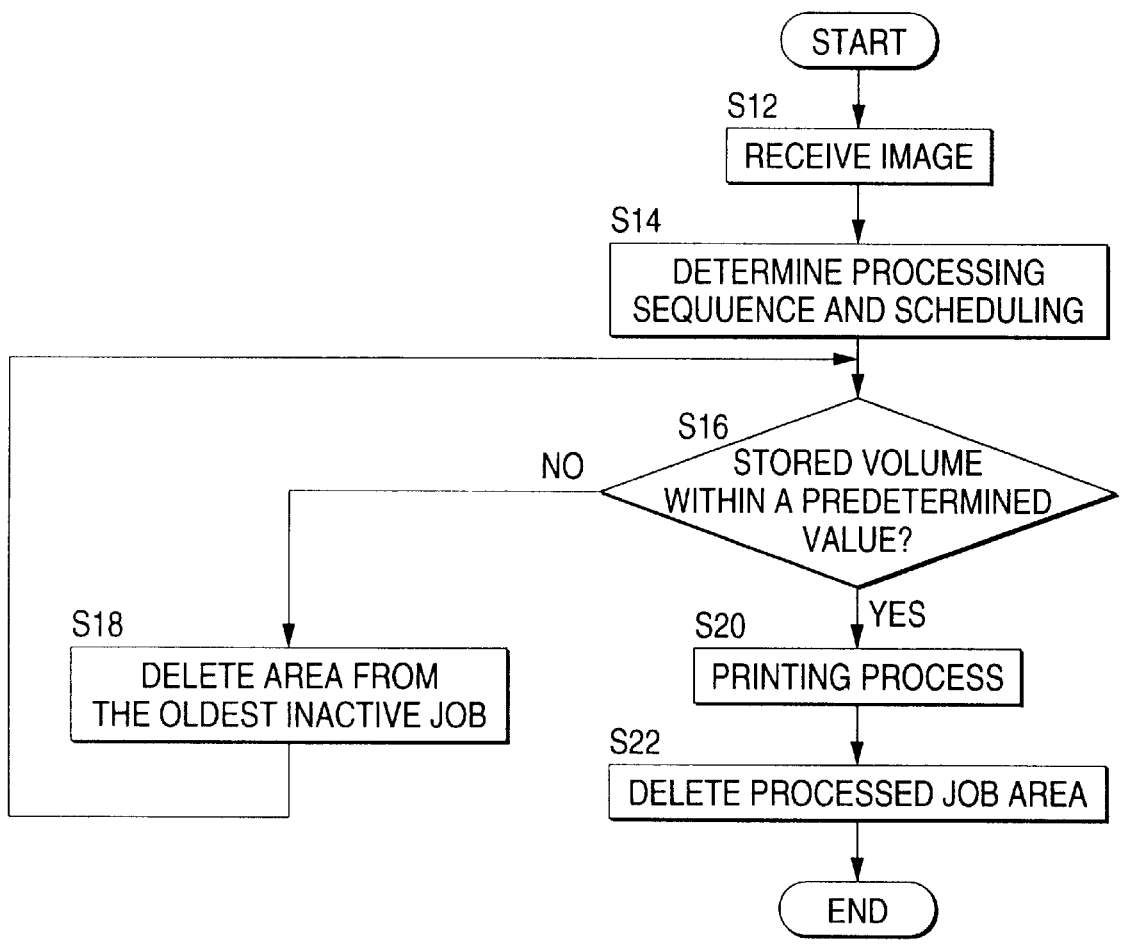
FIG. 10 is a flowchart showing a method of deleting and executing a job in embodiment 1.

FIG. 10 is a flowchart showing a method of deleting and executing a job. When an image is received from the image compressing means 45, the host interface 14, or the facsimile interface 18 (S12), the job management means 50 registers in the job table 48 the job ID, owner ID, host ID, priority, and receipt time of data as attribute information of the data. The job management means 50 also schedules job processing by determining the processing sequence based on such information (S14). The condition flag is set "active" at the same time.

Before loading a job, the volume of images stored in the image storage means 51 is checked (S16). When the volume of the images is within a predetermined value, data is stored and printed (S20). When the storage volume exceeds the predetermined value, inactive jobs are deleted sequentially from the oldest one to preserve area in the image storage means 51 until jobs can be stored therein (S18), the oldest being in terms of becoming "inactive". When the volume of the images stored becomes less than the predetermined value, the data is stored and printed (S20). After printing, the processed jobs are deleted (S22) and then the processing is ended.

Figure 11:
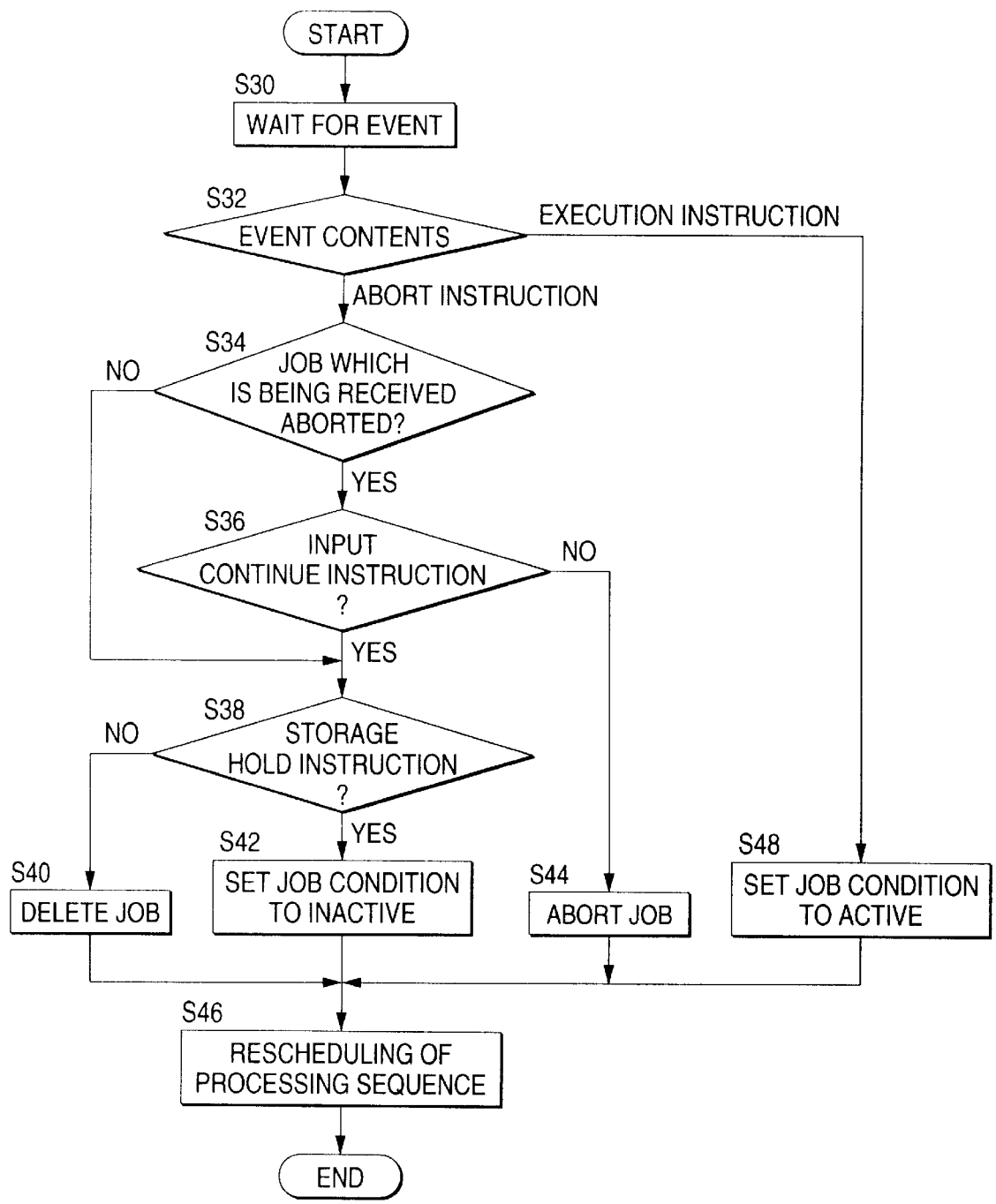
FIG. 11 is a flowchart showing a method of deleting and executing a job in embodiment 1.

FIG. 11 is a flowchart showing the operation of deleting and executing a job. When an operation panel key is pressed while waiting for an interrupt event (S30), the content of the event is judged through the pressed key (S32). If the abort key has been pressed, the job management means 50 is informed of an abort instruction of a job. The job management means 50 judges whether or not the instruction is to abort a job that is being received (S34). If the instruction is to abort a job that is being received, the job management means 50 further checks if an input continue instruction has been given to the continue instructing means 53 (S36).

If no input continue instruction has been given in S36, the job is suspended (S44). If an input continue instruction has been given in S36 or if an instruction for aborting a job that is not being received has been given, whether or not a stored information hold instruction has been given is inquired to the hold instructing means 52 (S38). If a storage hold instruction has been given, the condition flag of the job is set "inactive" (S42). If no storage hold instruction has been given, the job is deleted (S40).

Further, in the condition S30, the execution key of the operation panel is pressed to instruct the job management means 50 to execute a job (S32), the condition flag of the job is set "active" (S48). Then, the processing sequence is rescheduled (S46). As described above, according to the present embodiment, the data that has already been received can be utilized effectively when the job is resumed after abortion.

Embodiment 2

Figure 12A:
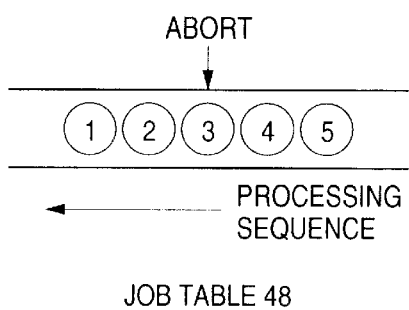
FIGS. 12A and 12B are diagrams illustrative of a method of changing the processing sequence of an aborted job in embodiment 1.
Figure 12A:
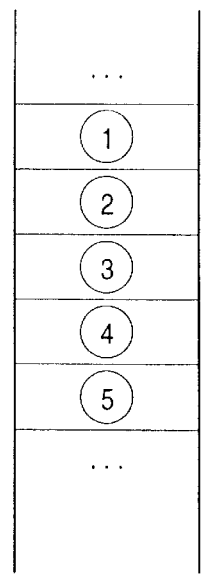
Figure 12B:
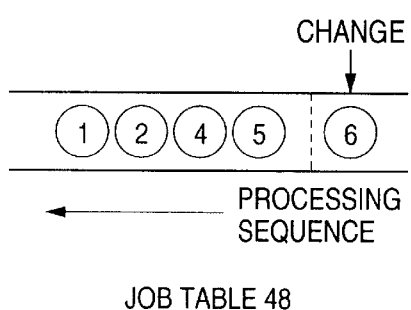
Figure 12B:
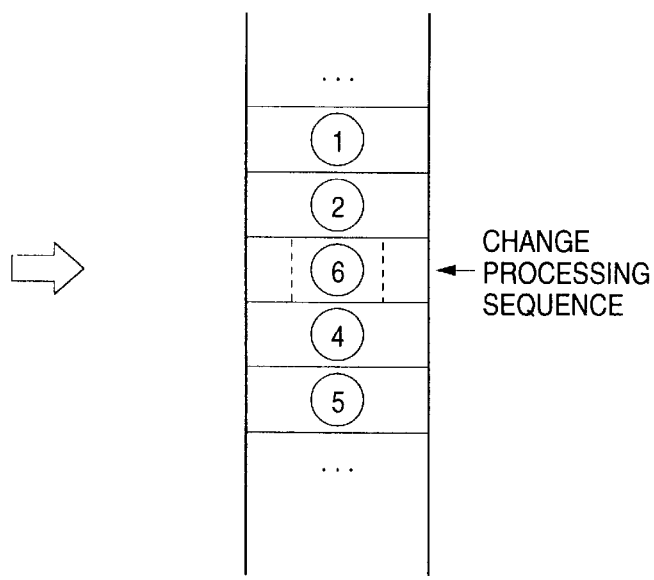
Figure 13A:
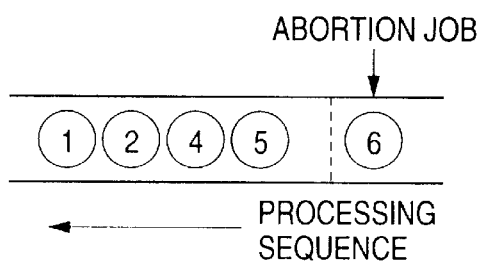
FIGS. 13A and 13B are diagrams illustrative of a method of deleting a job in embodiment 1.
Figure 13B:
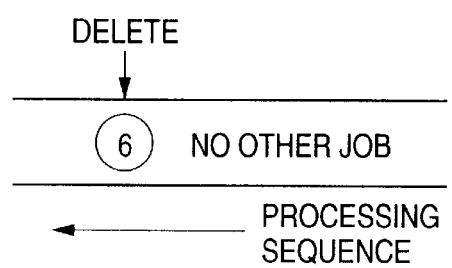
Figure 13B:
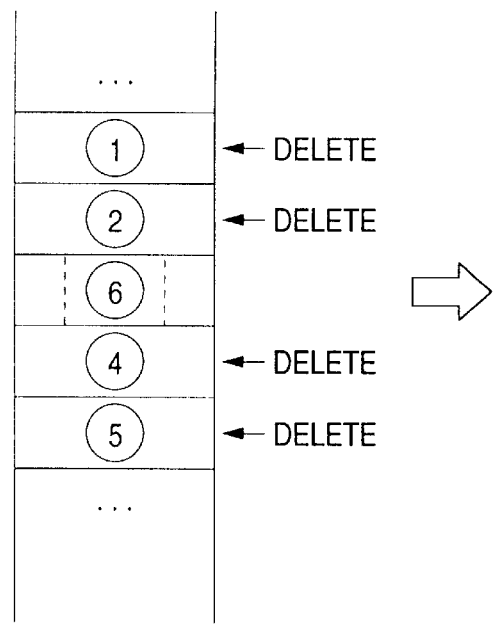
Figure 13B:
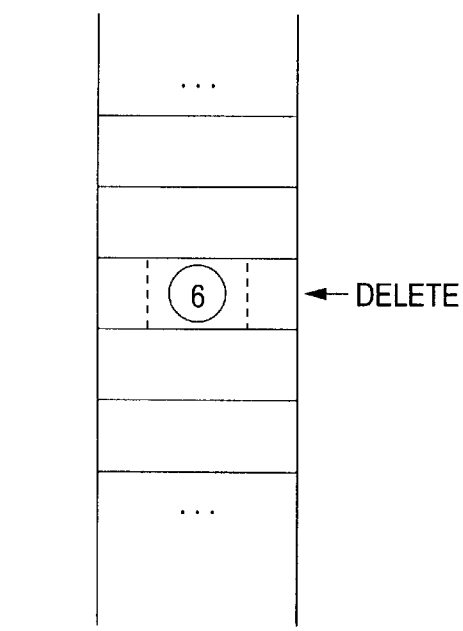

This embodiment is distinguished from embodiment 1 in the processing sequence of a job that is once aborted. FIGS. 12A and 12B are diagrams illustrative of a procedure of changing the processing sequence of an aborted job in the present embodiment. In FIG. 12A, job 3 is a job whose data has already been received and whose processing sequence is No. 3. When a job 3 abort instruction has been given from the abort/execute instructing means 49, the job management means 50 changes the processing sequence of job 3 so that job 3 will be processed as the last job of all the jobs currently stored. In FIGS. 12A and 12B, the processing sequence of job 3 is changed to No. 8 (FIG. 12B). The condition flag of job 3 is changed to "active" from "inactive". FIGS. 13A and 13B are diagrams illustrative of a job delete timing. First, the jobs 1, 2, 4, 5 are processed (FIG. 13A). Then, job 3 is deleted (FIG. 13B).

Figure 14A:
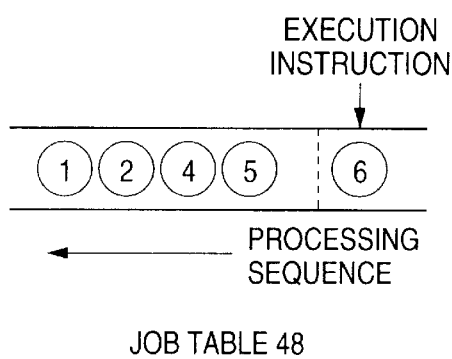
FIGS. 14A and 14B are diagrams illustrative of a method of executing a job in embodiment 1.
Figure 14A:
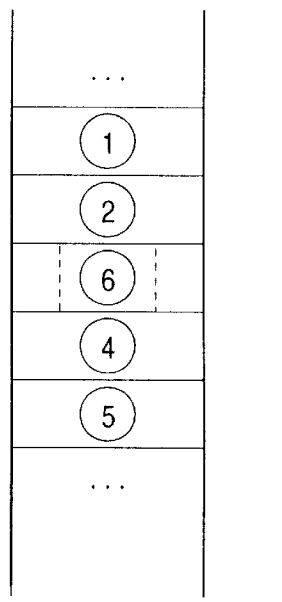
Figure 14B:
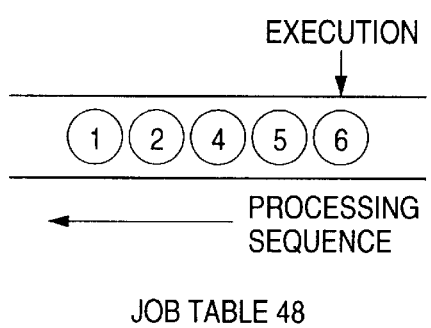
Figure 14B:
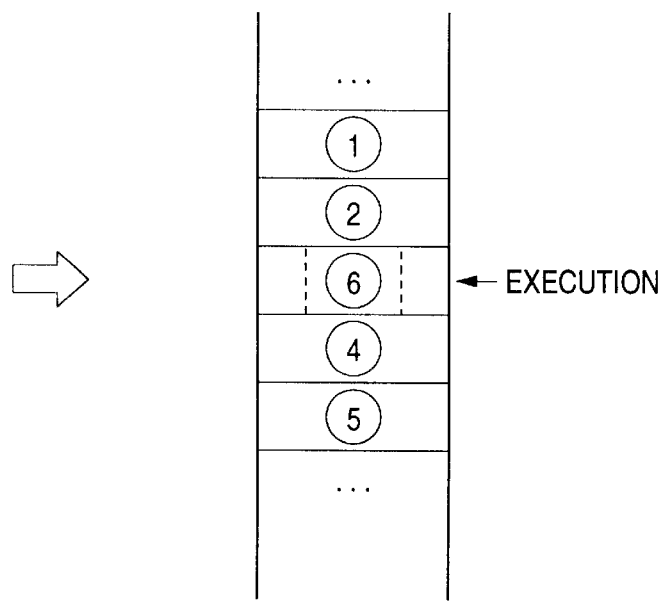

FIGS. 14A and 14B are diagrams illustrative of a method of executing a job whose condition flag is set "inactive". When the job management means 50 is informed from the abort/execute instructing means 49 that a job to which an abort instruction has been given but which has not yet been deleted will be executed, the condition flag of that job which is stored in the job table 48 is changed to "active" (FIG. 14A). Then, the processing sequence of this job is rescheduled and the job is processed as scheduled. Here the job is executed as the sixth job in accordance with the processing sequence that has been scheduled at the time of aborting the job (FIG. 14B).

According to the present embodiment, when a once aborted job is to be executed, the already received data can be used effectively. In addition, since a job to which an abort instruction has been given will not interrupt again, printing efficiency can be improved.

Embodiment 3

Figure 15:
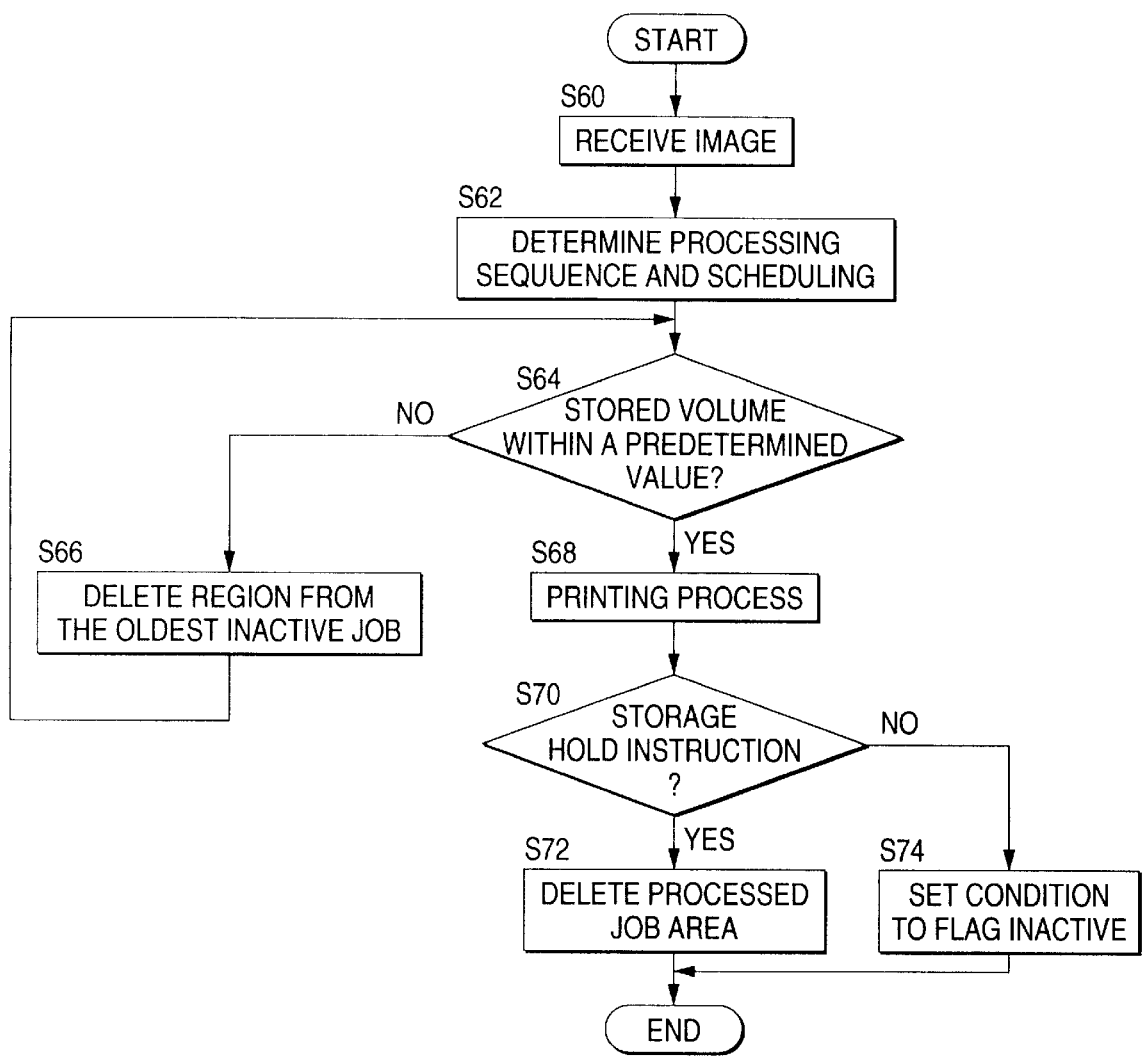
FIG. 15 is a flowchart showing an operation at the time of print processing in embodiment 1.

FIG. 15 is a flowchart showing an operation at the time of print processing. Since the hardware configuration of the present embodiment is the same as those embodiments 1 and 2, the description thereof will be omitted. When an image is received from the image compressing means 45, the host interface 14, or the facsimile interface 18 (S60), the job management means 50 registers in the job table 48 the job ID, owner ID, priority, and receipt time of data as attribute information of the data. The job management means 50 also schedules job processing by determining the processing sequence based on such information and stores the scheduled processing sequence in the job table 48 (S62). The condition flag is set "active" at the same time.

The volume of images stored in the image storage means 51 is checked (S64). When the volume of the images is within a predetermined value, the images are stored and printed (S68). When the storage volume exceeds the predetermined value, inactive jobs are deleted sequentially from the oldest one until jobs can be stored in the image storage means 51 in order to preserve area in the image storage means 51 (S66), the oldest being in terms of becoming "inactive". When the volume of the images stored becomes less than the predetermined value, received images are stored and printed (S68). Unless a printed job hold instruction is given (S70), the processed job is deleted and the processing is thereafter ended (S72). If a job hold instruction is given, the processing is ended by setting the condition flag of that job "inactive" (S74). The processing end may be judged by the oldest inactive job while numbering jobs whose condition flags have been set "inactive" in sequence.

Other

In embodiment 2, if the condition flag of a newly inputted job is "active", it may be so designed that such newly inputted job is scheduled to be processed earlier than a job whose processing sequence is changed to "inactive" by an abort instruction. As a result of this operation, the aborted job can be deleted after all other jobs to be processed have been processed. Further, the processing sequence of a job may be scheduled by determining the processing sequence by function. A job that is set "inactive" by an abort instruction may be held until the image storage means 51 runs out of storage area. In embodiment 2, already processed jobs may be held with the condition flags thereof set "inactive" without being deleted from the image storage means 51.

While the embodiments of the invention have been described above, the technical scope of the invention under the present application is not limited to such embodiments. The invention as recited in claims can be embodied by giving various modifications to the aforementioned embodiments. It is apparent from what is recited in the claims that such invention with modifications belongs to the technical scope of the invention under the present application.

As is apparent from the foregoing, according to the invention, already received images can be utilized effectively since the received or aborted job data are held. Since it is not required to read in the images again, printing operation can be performed efficiently. Further, since the processing is aborted in the processing sequence determined at the time a job is aborted, the invention can prevent abort processing of a job whose processing sequence comes later from retarding abort processing of a job whose processing sequence comes earlier.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus comprising:

an input means for inputting image data to be subjected to an image process;

a storage means for storing the image data inputted from the input means;

a processing means for reading out the image data stored in the storage means and subjecting the read image data to an instructed image process;

an aborting means for aborting the image process of the image data performed by the processing means;

a hold means for continuously holding the image data whose process has been aborted by the aborting means in the storage means;

a continuous input means for continuously inputting from the input means the image data whose process has been aborted by the aborting means; and an execution means for reading out the image data in the storage means held by the hold means from the storage means and resuming the image process of the image data aborted by the aborting means.

2. An image processing apparatus according to claim 1, wherein a continuous input instructing means for giving an instruction as to whether or not the image data is to be continuously inputted by the input means is arranged; and wherein the continuous input means continues inputting the image data on the condition that the continuous input instructing means has given an instruction for continuously inputting the image data.

3. An image processing apparatus according to claim 1, wherein the processing means performs a process for printing the image data.

4. An image processing apparatus comprising:

an input means for inputting image data to be subjected to an image process;

a storage means for storing the image data inputted from the input means;

a processing means for reading out the image data stored in the storage means and subjecting the read image data to an instructed image process;

an aborting means for aborting the image process of the image data performed by the processing means;

a hold instructing means for giving an instruction as to whether or not the image data whose process has been aborted by the aborting means is to be continuously held in the storage means;

a hold means for continuously holding the image data in the storage means based on the instruction from the hold instructing means;

an execution means for reading out the image data in the storage means held by the hold means from the storage means and resuming the image process of the image data aborted by the aborting means; and a delete means for deleting the image data held in the storage means by the hold means.

5. An image processing apparatus according to claim 4, wherein a continuous input instructing means for giving an instruction as to whether or not the image data is to be continuously inputted by the input means is arranged; and wherein the continuous input means continues inputting the image data on the condition that the continuous input instructing means has given an instruction for continuously inputting the image data.

6. An image processing apparatus according to claim 4, further comprising:

a priority determining means for determining a priority of the image data to be subjected to an image process by the processing means; and a priority descending means for descending the priority determined by the priority determining means with respect to the image data whose process performed by the processing means has been ended.

7. An image processing apparatus according to claim 6, wherein the delete means deletes the image data held by the hold means from the storage means if there is no instruction from the execution means by an image processing time to be determined by the priority determined by the priority determining means.

8. An image processing apparatus according to claim 4, wherein the delete means deletes the image data held by the hold means from the storage means if a process of all image data inputted by the input means has been ended.

9. An image processing apparatus according to claim 4, wherein the delete means deletes the image data held by the hold means from the storage means if a volume of image data stored by the storage means exceeds a predetermined value.

10. An image processing apparatus according to claim 4, further comprising a function recognizing means for recognizing a function of a job possessed by the image data inputted from the input means; and wherein the delete means determines a sequence of deletion of the image data based on the function of the job recognized by the function recognizing means.

11. An image processing apparatus according to claim 4, further comprising a continuous input means for continuously inputting the image data whose process has been aborted by the aborting means from the input means.

12. An image processing apparatus according to claim 11, wherein a continuous input instructing means for giving an instruction as to whether or not the image data is to be continuously inputted by the input means is arranged; and wherein the continuous input means continues inputting the image data on the condition that the continuous input instructing means has given an instruction for continuously inputting the image data.

13. An image processing apparatus according to claim 4, wherein the processing means performs a process for printing the image data.

14. A method of resuming an aborted image process comprising the steps of:

inputting image data to be subjected to an image process;

storing the inputted image data in a memory;

reading out the image data stored in the memory from the memory;

subjecting the read image data to an instructed image process;

aborting the image process of the image data;

continuously holding the image data whose process has been aborted in the memory;

continuously inputting the image data whose process has been aborted; and resuming the image process of the image data whose process has been aborted by reading out the image data continuously held in the memory.

15. A method of resuming an aborted image process according to claim 14, wherein the image process is a process for printing the image data.

16. A method of resuming an aborted image process comprising the steps of:

inputting image data to be subjected to an image process;

storing the inputted image data in a memory;

reading out the image data stored in the memory from the memory;

subjecting the read image data to an instructed image process;

aborting the image process of the image data;

continuously holding the image data whose process has been aborted in the memory;

continuously inputting the image data whose process has been aborted;

resuming the image process of the image data whose process has been aborted by reading out the image data continuously held in the memory; and deleting the image data held in the memory based on an instruction.

17. A method of resuming an aborted image process according to claim 16, wherein the image process is a process for printing the image data.

18. A method of resuming an aborted image process according to claim 16, further comprising the steps of:

determining a priority of the image data to be subjected to the image process by the processing means; and descending the priority determined by the priority determining means with respect to the image data whose image process has been ended.

19. A method of resuming an aborted image process according to claim 18, further comprising the step of deleting the image data held in the memory if no instruction for resuming the image process has been given by an image processing time to be determined by the priority determined.

20. A method of resuming an aborted image process according to claim 18, further comprising the step of deleting the image data held in the memory if all image processes of data to be processed among the image data have been ended.

21. A method of resuming an aborted image process according to claim 16, further comprising the step of deleting the image data held in the memory if a volume of image data stored in the memory exceeds a predetermined value.

22. A method of resuming an aborted image process according to claim 16, further comprising the step of recognizing a function of a job possessed by the image data inputted; and determining a sequence of deletion of the image data based on the function of the job recognized.

23. A method of resuming an aborted image process according to claim 16, further comprising the step of continuously inputting the image data whose image process has been aborted.

\* \* \* \* \*